United States Patent Office 2,995,953
Patented Aug. 15, 1961

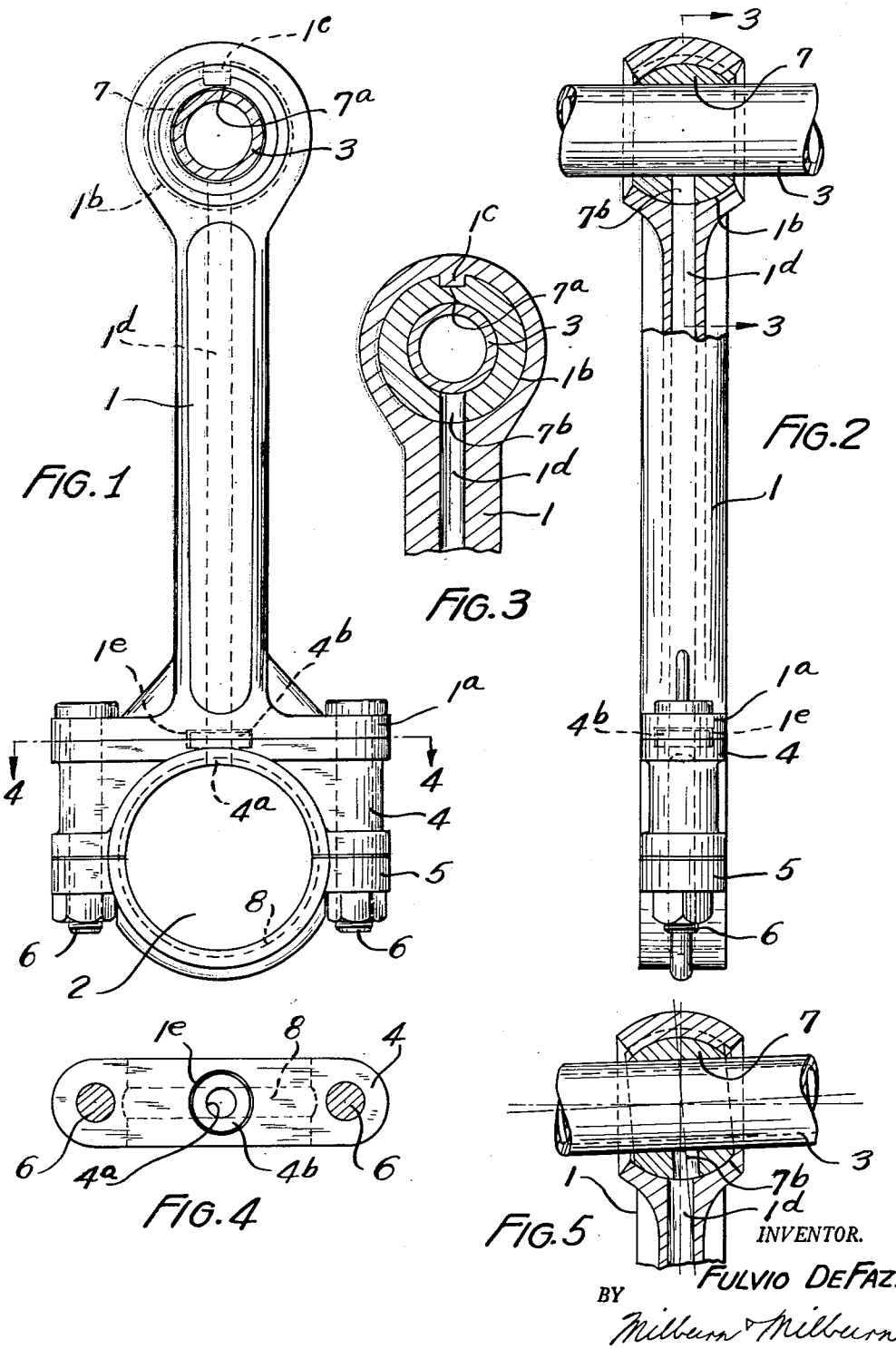

2,995,953
CONNECTING ROD FOR ENGINE
Fulvio De Fazi, 807 E. 222nd St., Bronx, N.Y.
Filed Dec. 7, 1959, Ser. No. 857,919
1 Claim. (Cl. 74—579)

This invention is for an improved form of connecting rod between the crank shaft and piston of an engine.

It is of course understood that it is practically impossible to build such an engine that is perfect in construction and operation, especially in the modern-day assembly-line high rate of production. For instance, there might be lateral arcuate movement of the connecting rod in the general direction of the longitudinal axis of the wrist pin and about the lower end of the connecting rod, causing misalignment of the piston in its cylinder; also there might be a situation in which the crank shaft and connecting rod are in perfect alignment but there is misalignment vertically between the cylinder and its piston and the connecting rod. In either case there would be a virtual braking action between the piston and its cylinder wall and undue friction, heat and wear and loss of operating efficiency.

It is such faulty construction and operation that the present invention is designed to correct, in either a new engine or an old one; and it is a further object to devise such a corrective means that can be easily manufactured at moderate cost.

More specifically, it is my object to devise a means that will permit relative lateral adjustment automatically between the connecting rod and the piston only in the direction of the longitudinal axis of the wrist pin so as to permit the piston to assume and maintain correct alignment at all times with respect to its cylinder in spite of the conditions above referred to, thereby increasing the efficiency of operation of the engine.

Other objects will appear from the following description and claim when considered together with the accompanying drawing.

FIG. 1 is an elevation of my present improved connecting rod assembly;

FIG. 2 is an elevation of the same, at ninety degrees to FIG. 1 and with part shown in section so as to indicate the ball and socket swivel connection with the key-way;

FIG. 3 is a sectional view of the upper part of the present connecting rod, shown at ninety degrees to FIG. 2;

FIG. 4 is a view corresponding to line 4—4 of FIG. 1;

FIG. 5 is a partial view illustrating the corrective action of my swivel connection with the key-way at the upper end of the connecting rod.

It is to be understood that the present form of disclosure is merely for the sake of illustration and that there might be various modifications thereof without departing from the spirit of my invention as herein set forth and claimed.

Referring now to the accompanying drawing in detail, the lower end of the connecting rod 1 has the bearing opening 2 for rotatable connection to the conventional crank shaft (not shown) and has connection at its upper end to the piston (not shown) by means of the conventional wrist pin 3.

In the present case I have provided the intermediate bearing member 4 that is arranged between the lower bearing cap member 5 and the upper bearing cap member 1a that is integral with the connecting rod 1. The connecting rod is made of aluminum and the bearing members 4 and 5 are made of aluminum alloy; this being for the purpose of avoiding over expansion when the engine is running hot. These bearing members are held together by the bolts 6.

The upper end of the connecting rod is cast with an integral socket 1b about the companion spherical ball member 7 of steel, this being accomplished by providing a mold within which the ball is centrally located and by pouring the molten metal for the rod around the ball. This socket 1b is of segmental form so as to permit suitable adjustment of the ball member 7 and the wrist pin 3 that extends therethrough; and, in order to restrict such adjustment to the direction corresponding with the longitudinal axis of the wrist pin, the inner surface of the upper part of the socket 1b is provided with an integral arcuate key portion 1c that fits within the companion arcuate key-way 7a in the ball member 7. In order to compensate for or to permit the lateral movement of the connecting rod in either of the situations above referred to, the curvature of the engaging surfaces of the ball and socket and that of the key and key-way is described about a center corresponding to the intersection of the longitudinal axis of the body portion of the connecting rod and the axis of the cylindrical opening of the spherical ball.

The lower part of the ball 7 has an aperture 7b therethrough in communication with the bore 1d through the connecting rod for passage of lubricating oil, the lower end of the bore 1d registering with the aperture 4a in the intermediate bearing member 4 for the same purpose; and the aperture 4a has communication with the continuous oil groove 8 in the inner surfaces of the bearing members 4 and 5. The intermediate bearing member 4 is provided in the middle of its top with an upwardly projecting pilot 4b for centering position within the corresponding recess 1e in the lower side of the bearing cap member 1a, this pilot 4b being apertured for passage of the lubricating oil therethrough.

Thus, with my present improvement, the piston will not be subjected to the lateral movement of the connecting rod, above referred to, as such movement will not be transmitted to the piston but will be offset and hence corrected automatically by the slight arcuate movement, as permitted by the key-way and its key, of the socket of the connecting rod about the ball through which the wrist pin extends; and the same compensating means will offset any misalignment between the piston and cylinder and the connecting rod, as illustrated in FIG. 5 of the accompanying drawing. As a result, the piston will always center itself within its cylinder; and there will be avoided the undue friction, heat and wear that would otherwise occur between the piston and its cylinder wall. Thus there will be obtained increased efficiency in operation. As each piston is provided with this same arrangement, each piston will automatically center itself independently of the others.

It will be observed that the adjustment of each piston, as permitted by its key and key-way, is restricted to one direction corresponding with the longitudinal axis of the wrist pin, it being desirable from the standpoint of efficient operation to prevent rotary movement of the piston about its longitudinal axis especially in the case of my present compensating means. My present invention ensures or compensates for the proper parallel relation between the axes of the crank shaft and the wrist pin in the case of each individual piston and also ensures or compensates for proper alignment between the piston and cylinder and the connecting rod throughout the cycle of operation.

Other practical advantages resulting from my present invention may suggest themselves to those who are familiar with the art to which it relates; and it is to be understood that the present form of disclosure is merely for the purpose of illustration and might be varied without departing from the spirit of my invention as herein set forth and claimed.

What I claim is:

A connecting rod comprising a body portion having at its one end means of rotatable connection for a crank shaft and having at its other end a spherical segmental socket, and a spherical ball within said socket, said ball having a cylindrical opening therethrough in a direction parallel to the axis of the rotatable connection for the crank shaft, the interengaging surfaces of said ball and socket having a key and key-way of arcuate form in interengagement therebetween in a direction corresponding to the longitudinal axis of said cylindrical opening, the curvature of said interengaging surfaces of said ball and socket and of said key and key-way being described about a center corresponding to the intersection of the longitudinal axis of the body portion of the connecting rod and the axis of the cylindrical opening of said spherical ball, and lubricating means therefor.

References Cited in the file of this patent

UNITED STATES PATENTS

| | | |
|---|---|---|
| 2,590,761 | Edgar | Mar. 25, 1952 |
| 2,626,841 | Potter | Jan. 27, 1953 |
| 2,738,687 | Meile | Mar. 20, 1956 |
| 2,846,897 | Schall | Aug. 12, 1958 |

FOREIGN PATENTS

| | | |
|---|---|---|
| 716,074 | Great Britain | Sept. 29, 1954 |